United States Patent [19]
Biesinger

[11] Patent Number: 6,161,701
[45] Date of Patent: Dec. 19, 2000

[54] SEPARATOR

[76] Inventor: Andrei C. Biesinger, 915 S. Main St., Oshkosh, Wis. 54901

[21] Appl. No.: 09/295,256

[22] Filed: Apr. 20, 1999

[51] Int. Cl.[7] .................................................. B01D 21/00
[52] U.S. Cl. ...................... 210/521; 210/532.1; 141/338
[58] Field of Search .................................. 210/232, 519, 210/521, 532.1, 513; 141/337, 338

[56] References Cited

U.S. PATENT DOCUMENTS

| | | | |
|---|---|---|---|
| 948,924 | 2/1910 | Goedecker | 210/532.1 |
| 1,122,581 | 12/1914 | Flitcraft | 141/337 |
| 1,355,070 | 10/1920 | Allen | 210/532.1 |
| 1,563,005 | 11/1925 | Allen | 141/338 |
| 2,467,949 | 4/1949 | Thomas | 210/532.1 |
| 2,924,253 | 2/1960 | Beddow | 141/337 |
| 3,707,404 | 12/1972 | Carlson et al. | 220/532.1 |
| 3,815,646 | 6/1974 | Conkley | 141/337 |
| 5,868,946 | 2/1999 | Nguyen | 210/532.1 |
| 5,921,448 | 7/1999 | Stewart | 141/338 |

*Primary Examiner*—Christopher Upton
*Attorney, Agent, or Firm*—R. Jonathan Peters

[57] ABSTRACT

The invention provides for an apparatus for separating particulate dispersed in a liquid phase from the major volume of the liquid. The separator comprises a substantially cylindrical member formed of a flexible material and adaptable to nest or be seated in a receptacle, such as a pail of sufficient size to hold enough liquid or cleaning solution and to accommodate the washing accessory such as a sponge. The separator has an annulus or rim which has at least one opening so that when the separator is inserted into a pail of water or other liquid, air will not be trapped beneath the separator and force it from its seat or to the surface of the liquid. The cylindrical member has an integrally formed concave surface disposed substantially horizontally when the separator is in use, in that this surface is configured as an inverted cone. The concave surface is provided with a centrally disposed opening to allow for the passage of particulate therethrough.

9 Claims, 6 Drawing Sheets

SEPARATOR

FIELD OF THE INVENTION AND BACKGROUND

This Invention relates to a separator. In its more specific aspect, this invention relates to a separator for separating particulate, such as dirt or other abrasive particles, from a liquid phase, such as water.

When washing or scrubbing a surface, especially a painted surface such as a motor vehicle, or a building panel, wall or ceiling, or a glass pane, with a washing solution, e.g. water which may contain a cleaning agent, one typically uses a sponge, squeegee, brush, mitten, rag, towel, and the like, and referred to herein and in the appended claims a washing accessory. After each wipe with the washing accessory, the accessory is rinsed in a suitable receptacle, e.g., pail, containing a liquid such as water or a cleaning solution. Particulate, such as dirt, paint particles, and other abrasive particles, which become attached, fastened or lodged to the washing accessory, are released or freed from the accessory and become dispersed in the liquid phase. As a result of any subsequent rinsings of the washing accessory in the washing solution, some of the particulate dispersed in the liquid phase from previous rinsings becomes attached or lodged onto the accessory. Even if the particulate sinks to the bottom, the motion or agitation of the liquid caused by rinsing churns the body of liquid and brings a substantial amount of the particulate up from the bottom, which then tends to cling to or be lodged onto the washing accessory. When the surface is wiped or scrubbed with the washing accessory, the particulate lodged in the accessory can scratch or gouge the surface, which is particularly troublesome with a motor vehicle because the finish of the vehicle can be damaged.

This invention has therefore has its purpose to provide a separator for separating particulate from a liquid phase.

It is another object of the invention to provide for a separator that leaves a liquid phase substantially free of particulate so that a washing accessory can be rinsed in the liquid phase as the washing solution with substantially no particulate attaching or clinging to the washing accessory.

It is still another object of the invention to provide a separator for separating particulate from a liquid phase that is relatively inexpensive and simple to use.

SUMMARY OF THE INVENTION

In accordance with the present invention, there is provided an apparatus for separating particulate dispersed in a liquid phase from the bulk or major volume of the liquid. The separator comprises a substantially cylindrical member or vessel, formed of a flexible material, adaptable to nest or be seated in a receptacle, such as a pail, which is of sufficient size to hold or contain an adequate amount of liquid or cleaning solution and to accommodate the washing accessory. The cylindrical member has an annulus or rim, which has at least one opening so that when the vessel is inserted into a pail of water or other liquid, air will not be trapped beneath the separator and force the it from its seat or to the surface of the liquid. The cylindrical member has an integrally formed, concave surface, in that this surface is configured as an inverted cone, and is arranged for horizontal disposition when the separator is in use. The concave surface is provided with at least one opening, preferably a centrally disposed opening, to allow for the passage of particulate therethrough, as explained in more detail below.

It will be observed that by reason of my invention and the structure of the separator, the separator will nest or seat in the pail or other suitable receptacle containing a liquid phase such as water or a suitable cleaning solution, and because it is formed of a flexible material, e.g. plastic, cylindrical member, such as the annulus, will conform to the interior wall of the receptacle. When the washing accessory, such as a sponge, is rinsed in the liquid, substantially all of the particulate will be released from the accessory and become dispersed in the liquid phase. The particulate tends to sink to the bottom, and the concave surface or horizontal wall of the separator directs the particulate to the opening or openings. The particulate falls through the openings, e.g. the central opening, in the concave surface and to the bottom of the receptacle, and the particulate is entrapped by the concave surface and the bottom of the receptacle. Any subsequent rinsings, which agitates, churns or stirs the liquid, will not re-disperse the particulate entrapped in the bottom of the receptacle, but rather the particulate will remain below the concave surface of the separator and not be re-dispersed in the major volume or bulk Of the liquid above the concave surface of the separator.

In a preferred embodiment of the invention, the concave surface has a central opening, and an annular neck depends downwardly from the central opening. This neck is relatively short, and when the separator is utilized, the neck sits above the bottom of the receptacle, and when several separators are stacked, as when stored or shipped, the neck prevents adjacent separators from jamming.

In accordance with one embodiment of the invention, the cylindrical side wall of the separator is tapered or inclined so as to flare outwardly in that the top diameter is less or smaller than the bottom diameter. Thus, when the separator is inserted into a pail or other receptacle, the bottom marginal edge or annulus of the inclined wall will rest or seat on the interior side wall of the receptacle, thereby allowing the separator to nest or seat against the side wall. In this manner, the separator seats above the very bottom of the receptacle. As an alternative, the cylindrical side wall of the separator vessel can be sloped or inclined inwardly so that the top marginal edge or annulus of the separator will seat against the side wall of the receptacle. In either embodiment, an annulus of the separator seats on the side wall of the receptacle, which prevents the separator from resting on the bottom of the pail. This feature is advantageous because it allows for a sufficient volume to accommodate or accept the particulate and some liquid, and entrap or maintain the particulate below the concave surface of the separator and out of the major volume or bulk of the liquid phase.

BRIEF DESCRIPTION OF THE ACCOMPANYING DRAWINGS

The invention and its advantages will be more readily understood by reference to the following detailed description and exemplary embodiments when read in conjunction with the following drawings, wherein.

DETAILED DESCRIPTION OF THE INVENTION

Figure 1:
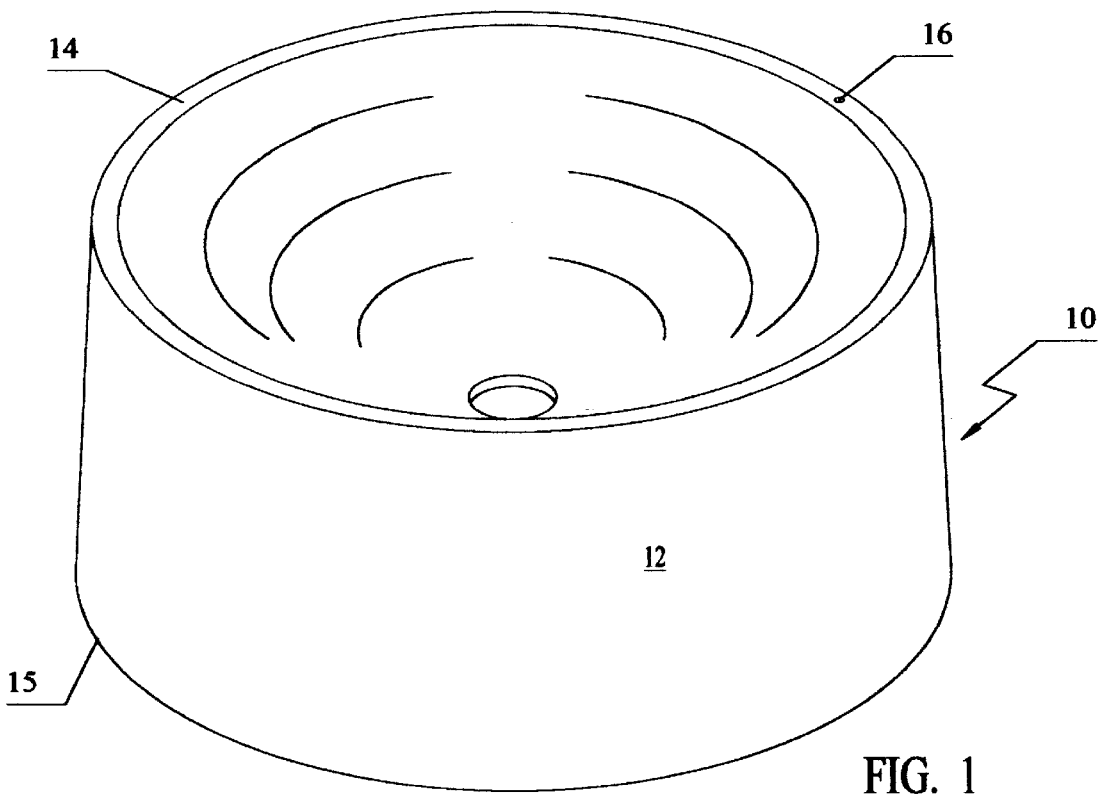
FIG. 1 is a perspective view of a separator apparatus, and embodying the features of the invention.
Figure 2:
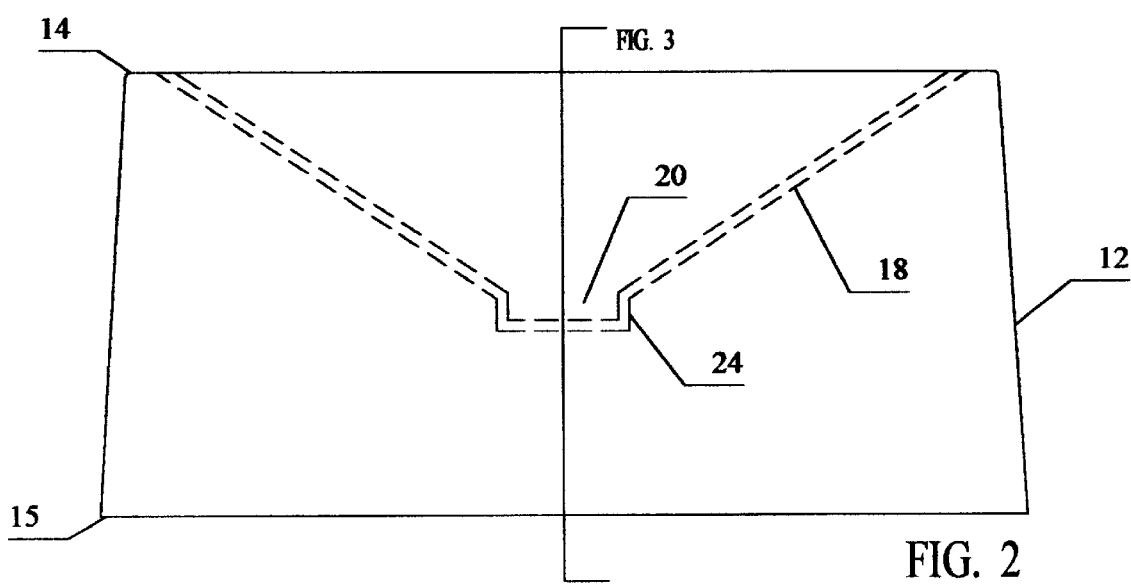
FIG. 2 is a side elevational view of the separator apparatus of FIG. 1 showing in more detail an embodiment of the invention.
Figure 3:
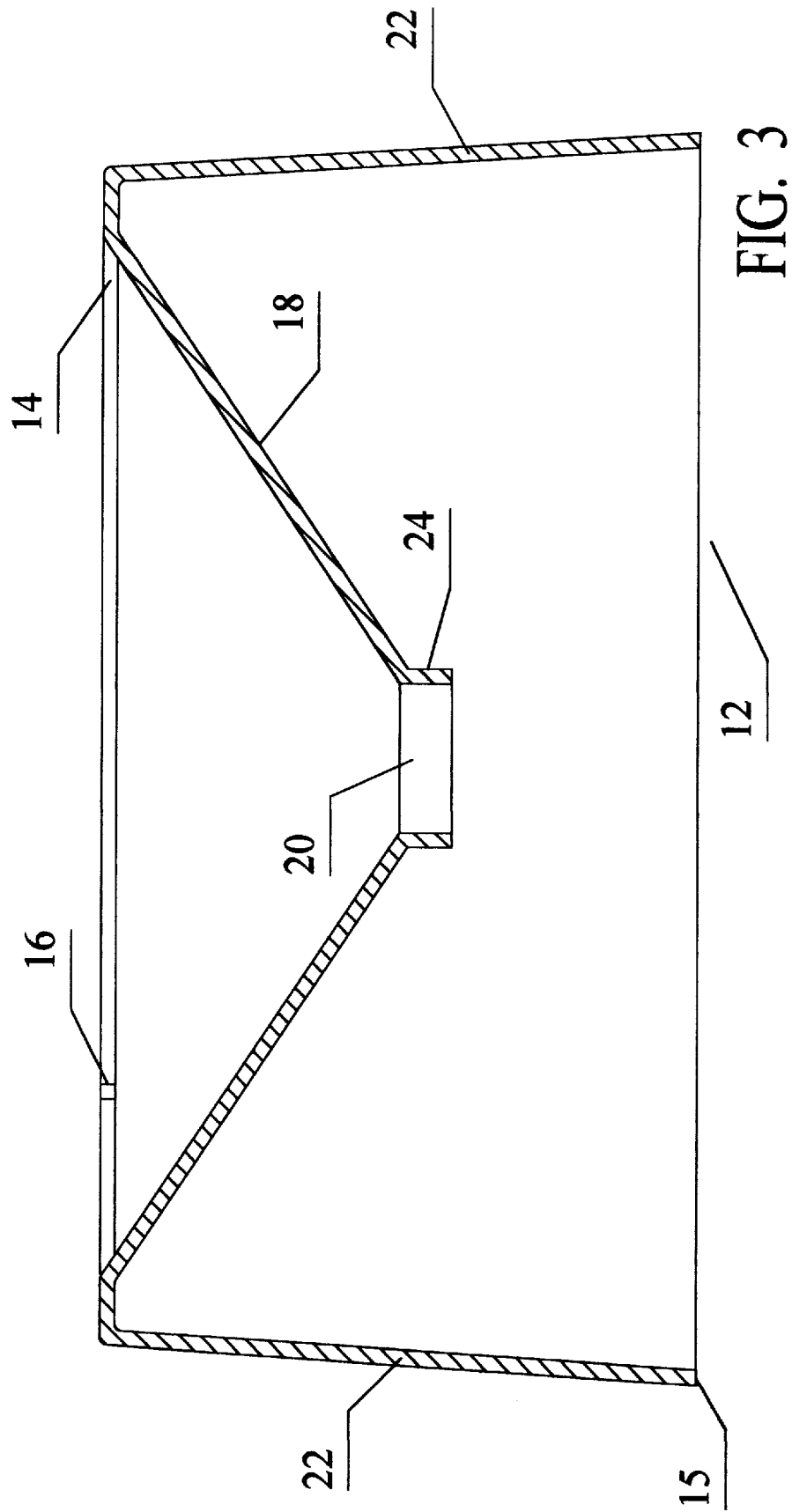
FIG. 3 is a cross-sectional view taken on line 3—3 of FIG. 2 showing in more detail certain features of the invention.

In accordance with the invention and as exemplified in the drawings wherein the same reference numerals refer to similar parts throughout the several views, and referring first to FIGS. 1, 2 and 3, there is shown a separator, indicated generally by the numeral 10, formed of a suitable flexible material, most typically a plastic such as polyethylene, polyvinyl chloride, or the like, and can be manufactured by injection molding or extrusion molding. The separator comprises a cylindrical member 12 adaptable to be seated or nested in a receptacle or pail containing a cleaning solution such as water, or water and a cleaning agent, e.g., a detergent, and explained below in greater detail. The cylinder 12 includes a top annulus 14 and a bottom annulus 15. It should be understood that the term "annulus" as used herein and in the appended claims is used generically and is intended to mean or include or to be interpreted as, for example, rim, border, edge, marginal edge, or margin of the cylinder. In the embodiment shown, the top annulus 14 extends laterally from the cylinder, but where desired, the annulus can be the top edge (or the bottom edge) of the cylindrical member. One or more holes or openings 16 are provided in or adjacent the annulus, in that the embodiment illustrated shows the opening 16 in the annulus, per se, but the opening can be positioned in the wall of the cylinder and adjacent the annulus. Cylindrical member 12 has a concave surface 18 which is substantially circular in plan view, configured as an inverted cone in elevational view, so that the wall of the concave surface, as viewed in cross-section, converges at a position or zone below the annulus 14. The lower zone of the concave surface 18 is provided with a centrally disposed opening 20, which should be of sufficient diameter so that the opening allows particulate to pass through and does not become clogged with particulate, as explained below. Where desired, the concave surface may be provided with a plurality of openings which, for example, can be arranged on a common circle concentric with the perimeter of the concave surface, or can be arranged in other patterns. Alternatively, the concave surface can be reticulated so as to have a relatively large number of openings, but such openings would be small yet sufficient to allow the particulate to pass through and deter or prohibit particulate from rising back through and into upper part of the receptacle into the major portion of the liquid. A side wall 22 of the cylindrical member depends downwardly from the annulus 14, preferably below the central opening 20 so as to encompass the concave surface 18, but where desired the bottom edge of the side wall 22 may terminate above the lower zone of the surface 18.

Figure 4:
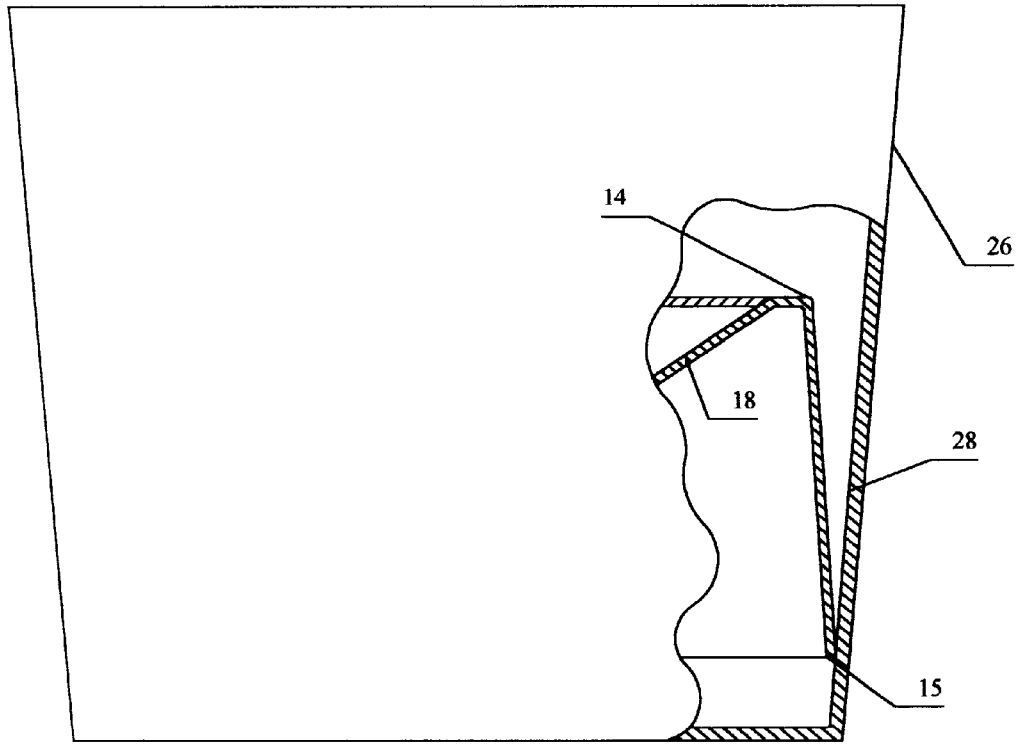
FIG. 4 is a side elevational view of the separator apparatus of FIG. 1, partly in fragmentary, showing the separator seated or nested in a pail containing water.
Figure 5:
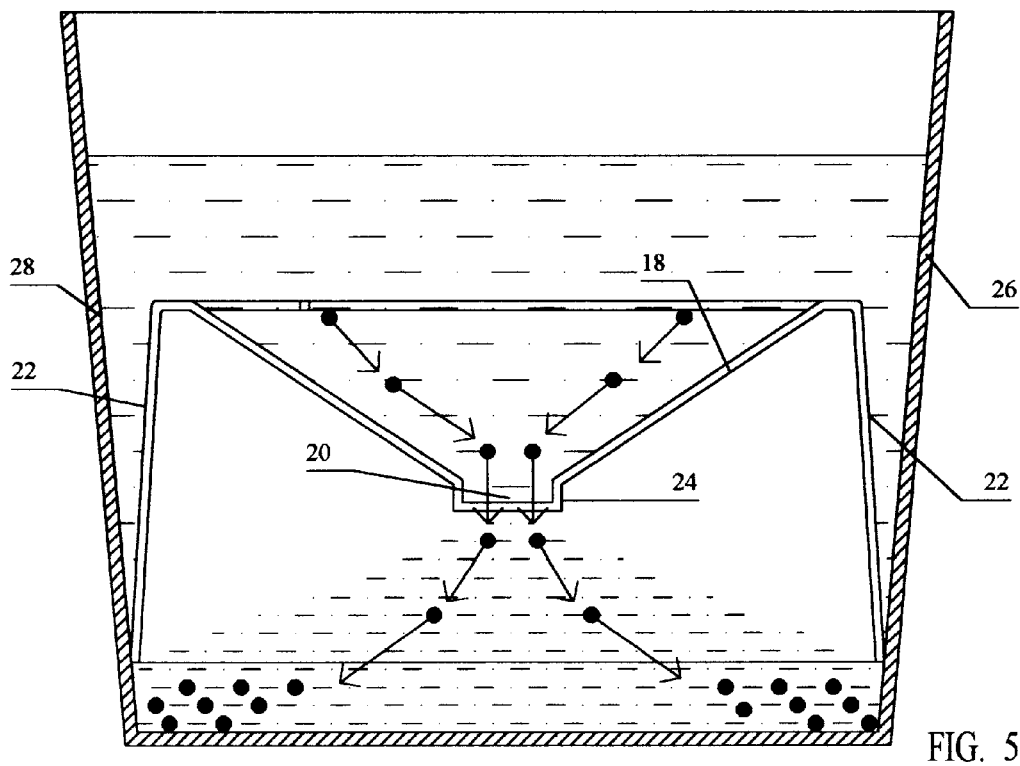
FIG. 5 is a view similar to FIG. 4 showing the disposition of the particles when the separator would be in use.

In a preferred embodiment of the invention, an annular neck 24 depends downwardly from the central opening 20. This neck 24 is relatively short, and terminates above the bottom marginal annulus or edge 15 of the side wall 22. Thus, when the separator is utilized and seated in a receptacle 26, the neck sits above tile bottom of the receptacle. (See FIG. 4.) When the separator is not in use, and several are stacked, as when stored or shipped, the neck prevents one separator from jamming with an adjacent separator.

In accordance with the embodiment illustrated in FIGS. 1–4, the side wall 22 is flared or sloped outwardly, so that the bottom diameter is slightly larger than the top diameter. Thus, when the separator vessel 12 is inserted into a pail or other receptacle 26 containing a washing liquid, and because the separator is fabricated of a flexible material, e.g., plastic, the annulus or marginal edge. 15 of the inclined wall 22 will conform to the interior wall 28 of the receptacle and will rest or seat on the interior wall, thereby allowing the separator to nest or seat against the interior wall In this manner, the separator seats above the very bottom of the receptacle. 26, whereby particulate will pass through the central opening 20 and to the bottom of the receptacle.

When the separator is utilized, the separator 12 is inserted into the receptacle 26 so that the annulus of the cylindrical wall 22 abuts or seats against the interior of wall 28, and in this manner the separator does not rest on the bottom of the receptacle. The receptacle contains water or other cleaning solution, which can be added before or after the separator is positioned in the receptacle. Opening 16 in annulus 14 allows air (entrapped beneath the separator to leak out, for otherwise entrapped air would cause the separator to float and not permit a firm seating in the pail. When the washing accessory, such as a sponge, is rinsed in the liquid phase, particulate such as dirt particles or other abrasive particles is released from the sponge and dispersed in the liquid phase. The solid particles sink to the bottom of the concave surface 18 and pass through the central opening 20, and the particles are thereby entrapped beneath the concave surface. Subsequent rinsing will not churn these entrapped particles into the liquid phase above the concave surface, but will remain entrapped, thereby providing for a washing accessory that is substantially free of particulate.

Figure 6:
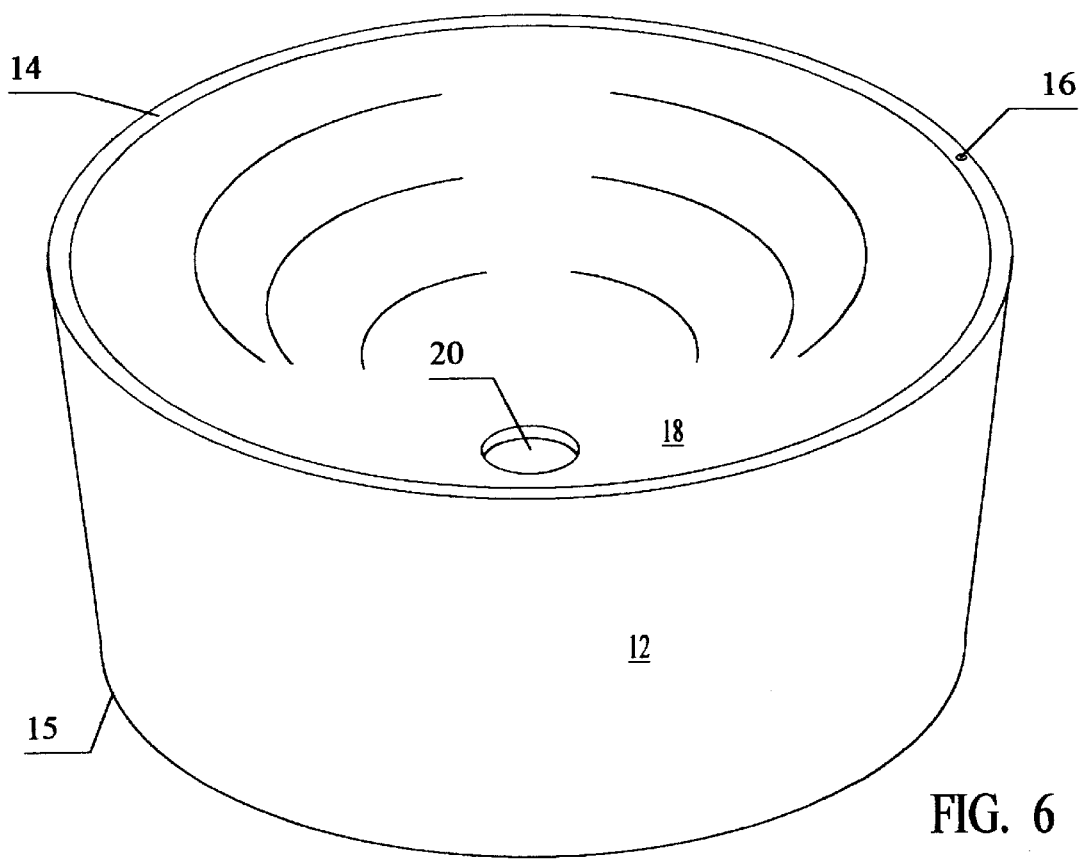
FIG. 6 is a front elevational view of an alternative embodiment of the separator.
Figure 7:
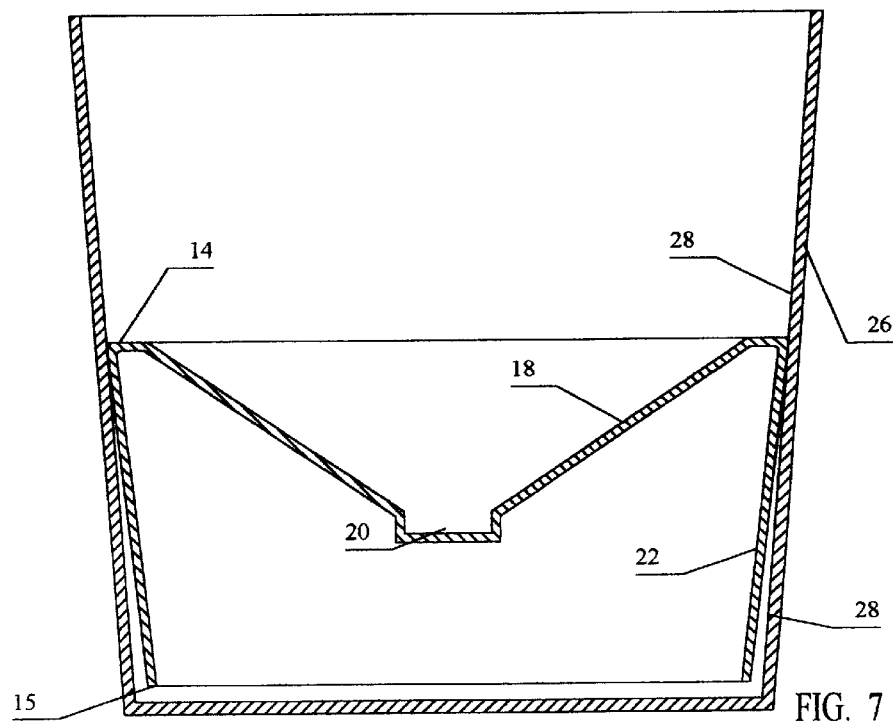
FIG. 7 is a side elevational view of the separator apparatus of FIG. 6, partly in fragmentary, showing the separator seated or nested in a pail containing water.

As an alternative embodiment of my invention as shown in FIGS. 6 and 7, the side wall 30 of the cylindrical member can be sloped or inclined inwardly so that the top diameter is slightly greater than the bottom diameter. As with the embodiment described above, in this modification the top annulus 14 of the cylindrical member 12 will seat against the side wall 28 of the receptacle. In either embodiment, the annulus or edge of the cylinder wall prevents the separator from resting on the bottom of the pail. This feature is advantageous because it allows for a small but sufficient volume to accommodate or accept the particulate and some liquid below the concave surface of the separator and hold or maintain the particulate in this relatively small volume, and not in the major volume or bulk of the liquid phase.

Figure 8:
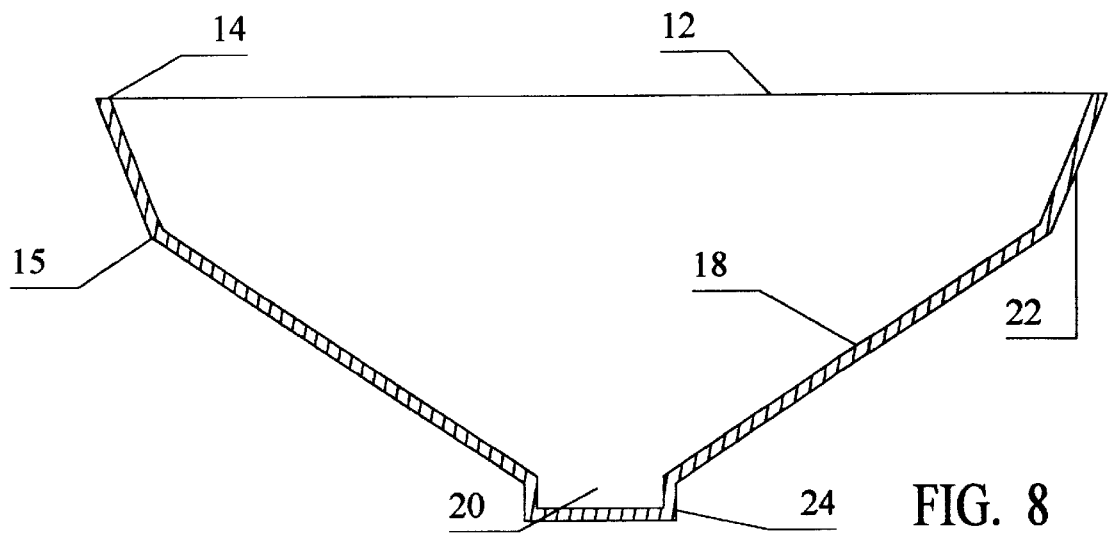
FIG. 8 is a side elevational view in cross-section of another embodiment of my invention.

In yet another embodiment of my invention, there is illustrated in FIG. 8 a separator 10 where the cylinder wall slopes or tapers inwardly so that the top diameter of cylindrical member 22 is greater than the bottom diameter. The concave surface 18 depends downwardly from the bottom annulus 15 of the cylinder wall 22. The concave surface has a central opening 20 with a downwardly depending neck 24, as described above, and where desired, surface 18 may have a plurality of openings. The separator of this embodiment is utilized in the same manner as described above.

Figure 9:
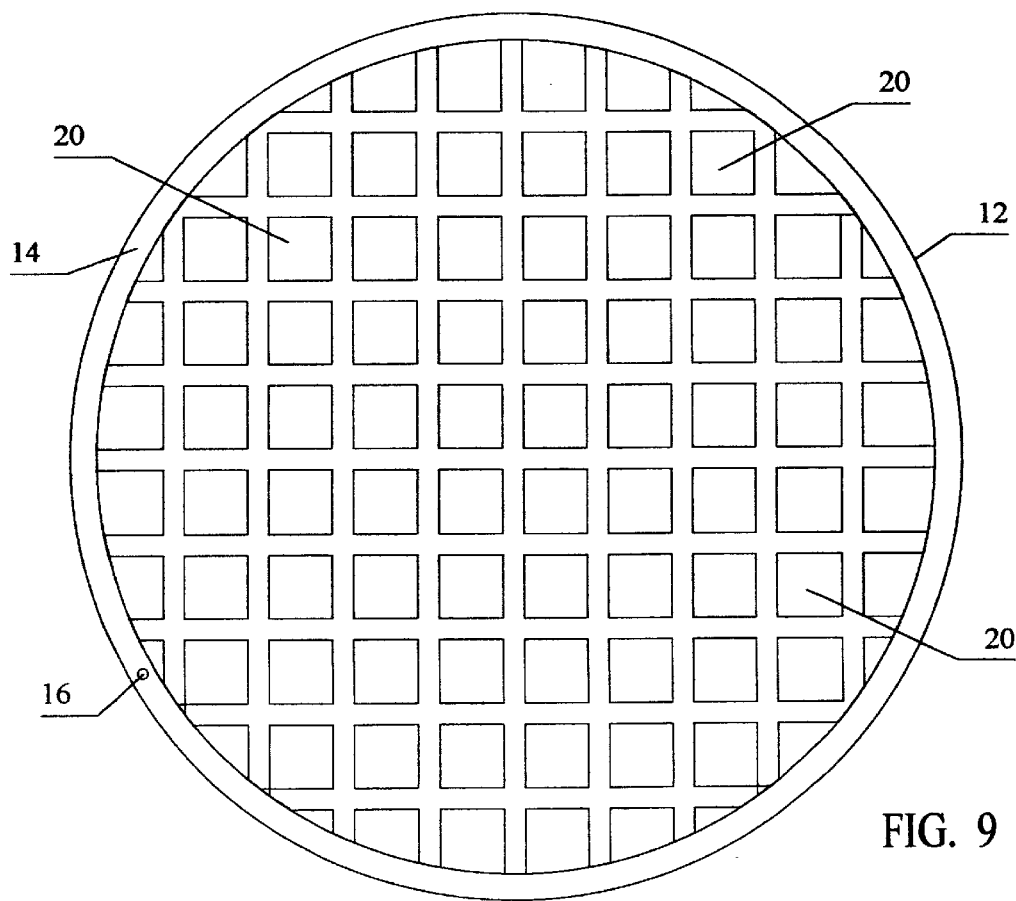
FIG. 9 is a plan view of a modification of the concave surface.
Figure 10:
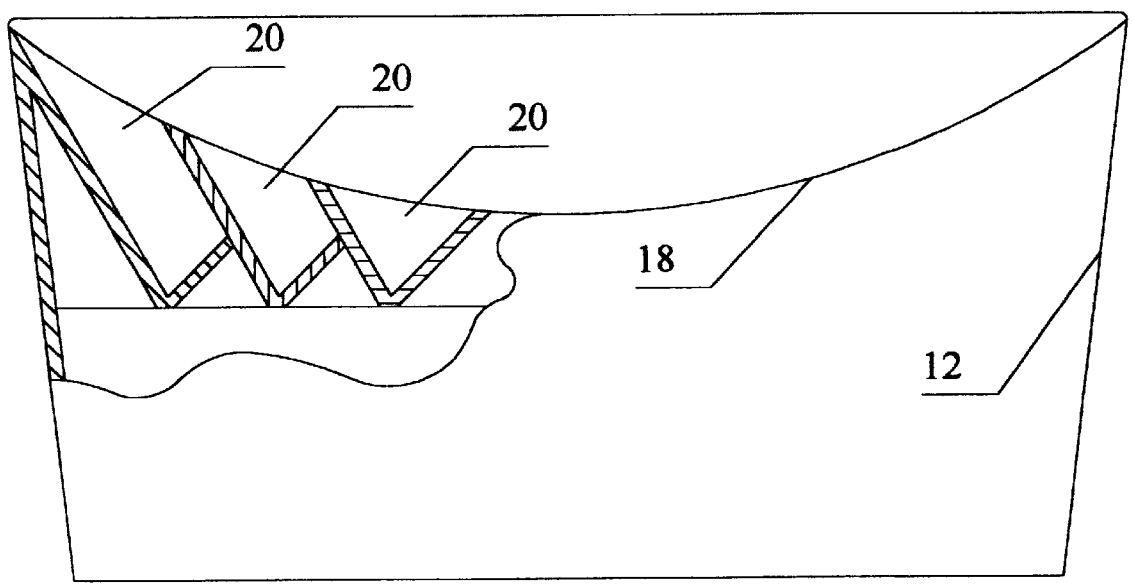
FIG. 10 is a cross-sectional view in fragmentary of a modification of the openings for the concave surface.

FIG. 9 shows the concave surface 18 formed as a reticulated structure with a plurality of openings 20. As shown in cross-section in FIG. 10, the openings are inclined relative to the vertical axis of the cylinder. It should be understood that regardless of the number of openings in the concave surface, the inclined or sloped disposition of the walls of the openings can be utilized in any of the other embodiments of the invention. This configuration is advantageous in that the slope or incline of the openings deters the particulate from re-entering the liquid above the concave surface.

It will be observed that by reason of my invention, the separator apparatus provides several advantages, including entrapment or isolation of the particulate from the major volume of the liquid phase used as a cleaning solution. Further, it should be understood that the foregoing detailed description has been given for clearness of understanding only, and no unnecessary limitations should be understood therefrom, as modifications will be obvious to those skilled in the art.

Having described this invention and certain embodiments, I claim:

1. Apparatus for separating particulate dispersed in a liquid from the major volume of the liquid by entrapping most of the particulate in the bottom of a receptacle for holding the liquid, comprising: a substantially cylindrical member formed of a flexible material and having a top annulus and a bottom annulus, said cylindrical member adaptable for nesting in vertical disposition in a receptacle and conformable to the interior wall of the receptacle, said top annulus of said cylindrical member adaptable for being submerged below the surface of said liquid and having at least one opening; and a concave surface for substantially horizontal disposition depending from said cylindrical member and integrally formed therewith, said concave surface having at least one opening to allow for the passage of particulate therethrough.

2. An apparatus for separating particulate dispersed in a liquid phase according to claim 1 wherein the wall of said cylindrical member is inclined inwardly so that the top diameter of said cylindrical member is greater than the bottom diameter, and said concave surface has one centrally disposed opening.

3. An apparatus for separating particulate dispersed in a liquid phase according to claim 2 and further including an annular neck depending downwardly from said centrally disposed opening.

4. An apparatus for separating particulate dispersed in a liquid phase according to either of claims 1, 2 or 3 wherein said concave surface depends from about the bottom annulus of said cylindrical member.

5. An apparatus for separating particulate dispersed in a liquid phase according to either of claims 1, 2 or 3 wherein said concave surface depends from the top annulus of said cylindrical member.

6. An apparatus for separating particulate dispersed in a liquid phase according to claim 1 wherein said concave surface depends from about the top annulus of said cylindrical member and said cylindrical surface is inclined outwardly so that the top diameter of said cylindrical member is smaller than the bottom diameter, and said concave surface has one centrally disposed opening.

7. An apparatus for separating particulate dispersed in a liquid phase according to claim 6 and further including an annular neck depending downwardly from said central opening.

8. Apparatus for separating particulate dispersed in a liquid phase from the major volume of the liquid by entrapping most of the particulate in the bottom of a receptacle for holding the liquid, comprising: a substantially cylindrical member formed of a flexible material and adaptable for nesting in a receptacle, said cylindrical member having (a) an annular rim adaptable for being submerged below the surface of said liquid, (b) at least one opening in said rim, (c) a concave top surface depending from said rim, (d) a side wall depending downwardly and outwardly from said rim and encompassing said concave top surface, (e) a centrally disposed opening in said concave top surface to allow for the passage of particulate therethrough, and (f) an annular neck depending downwardly from said centrally disposed opening.

9. Apparatus for separating particulate dispersed in a liquid phase from the major volume of the liquid by entrapping most of the particulate in the bottom of a receptacle for holding the liquid, comprising: a substantially cylindrical member adaptable for nesting in a receptacle, said cylindrical member having (a) an annular rim adaptable for being submerged below the surface of said liquid, (b) at least one opening in said rim, (c) a concave top surface depending from said rim, (d) a side wall depending downwardly and inwardly from said rim and encompassing said concave top surface, (e) a centrally disposed opening in said concave top surface to allow for the passage of particulate therethrough, and (f) an annular neck depending downwardly from said centrally disposed opening.

* * * * *